UNITED STATES PATENT OFFICE 2,666,583

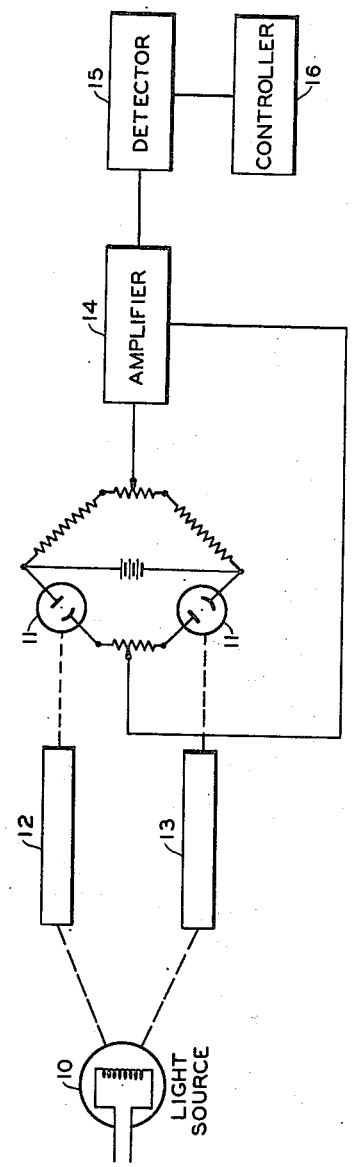
INVENTOR.
W. B. WHITNEY

THERMORESPONSIVE COLOR CHANGE CONTROL DEVICE

William B. Whitney, Bartlesville, Okla., assignor to Phillips Petroleum Company, a corporation of Delaware Application September 7, 1951, Serial No. 245,601

7 Claims. (Cl. 236—1)

This invention relates to a thermoresponsive control method and device employing compounds which are sensitive to changes in temperature, the change in temperature being shown by a change in color of the compound.

In one of its aspects the invention provides compounds which change color with change in temperature which together with a photocell and appropriate circuits can be employed to control temperature automatically.

In the regulation of constant temperature baths and similar apparatus there is usually used an intermittent heater controlled by a regulator which is sensitive to the heat. This regulator is usually of the type in which the expansion of a metal or liquid in response to heat is utilized to open and close an electrical heating circuit. Thus, the response is completely on or completely off. Often it has been desired that the response be proportional to, inversely proportional to or at least some function of the temperature. For example, it may be desired that the heater input be gradually diminished as the temperature rises and increased as the temperature falls so that an equilibrium may be established in which a given quantity of heat is constantly added to maintain a given temperature.

I have now found that certain organic compounds give chromatic responses to thermal changes. For example, ditolyl disulfide and diphenyl disulfide, or their oil solutions, gradually change from almost colorless to dark yellow or even orange when heated from room temperature to elevated temperatures. The change is reversible, changes of 15 to 25 degrees are perceptible with the naked eye. Color changes continue to occur up to at least 125° C. above room temperature.

In the laboratory preparation of these materials, usually an excess of aromatic hydrocarbons is heated at about 100° C. with 1 to 3 per cent by weight of the catalyst (zinc chloride) while sulfur monochloride is added. Commercial products were also used and they gave the same chromatic responses.

Therefore, according to this invention there is provided a method for control of temperature which comprises subjecting an organic disulfide which is thermochromatic to the influence of the temperature to be controlled, determining any color change induced by any variation in said temperature and employing said change to alter the said temperature.

Also, according to the invention there is provided a specific means, for practicing the method of the invention, comprising in combination, a thermochromatic organic sulfide, a photocell responsive to the color changes, induced by temperature changes, and electrical currents to control the temperature as determined by said photocell.

The following embodiment of the invention utilizing chromatic response of the said compounds to thermal changes for automatic control of temperature is set forth by way of example. In the drawing the device consists of a light source 10, two photoelectric cells 11 for observing the light source 10, two tubes 12 and 13 for controlling the paths of the light between the light source 10 and the photoelectric cells 11, a light filter in tube 13 which contains a substance which responds to temperature changes by changing color or intensity of color, a light filter in the tube 12 which contains a substance that does not respond to temperature changes by changing color, an amplifier 14, a detector 15 and a controller 16 to regulate temperature, the regulation being a function of the temperature of the substance changing color with temperature. The two photoelectric cells 11 are connected so that the output of one opposes the output of the other and the net output is that which is taken to the amplifier. This arrangement is desirable so that variations in the intensity of the light source 10 will be cancelled out and will not cause variations in the input of the amplifier. Various accessories may be added such as light filters to make both photoelectric cells 11 responsive to the same bands of light.

Alternatively, the filtered light beam may be directed through a prism which will shift the beam between several photoelectric cells as the temperature, and, hence, the wavelength of the filtered beam, change. These photoelectric cells would then be connected to the appropriate circuits for the control of temperature.

As indicated, the basic concept of this invention may be modified in many ways. Thus in the application of this invention, the source of radiation used may provide X-rays, visible light, ultraviolet light, or infra-red light waves. The voltage may be suitably amplified to operate a throttling valve or other control means.

Reasonable variation and modification are possible within the scope of the foregoing disclosure, the drawing, and the appended claims to the invention the essence of which is that certain organic sulfides have been found to be thermochromatic and that a method and means for controlling temperature by determining color change of one of said sulfides with change in temperature have been set forth and described.

In respect of the method and device herein set forth, it will be obvious to those skilled in the art, possessed of this disclosure, that the thermochromatic responsive substance need not be one the response of which is detactable by the human eye as long as it possesses a response detectable by means of, for example, a photoelectric cell. In this connection, it should be noted that it is within the scope of the appended claims to employ other than the said certain organic sulfides which have been discovered to possess thermochromatic response and to be particularly desirable and useful in the execution of the concept of the invention here disclosed.

I claim:

1. A method for controlling a temperature which comprises subjecting a thermochromatic substance to the effect of said temperature, passing a radiation through said substance sensing color change in said radiation after its passage through said substance induced by variation in said temperature and employing said change to re-establish the said temperature.

2. A method for controlling a temperature which comprises subjecting a thermochromatic organic disulfide to the effect of said temperature, passing a light radiation through said organic disulfide sensing color change in said radiation after its passage through said organic disulfide induced by variation in said temperature and employing said change to re-establish the said temperature.

3. A method for controlling a temperature which comprises subjecting a thermochromatic organic disulfide selected from the group consisting of ditolyl disulfide, diphenyl disulfide and their oil solutions to the effect of said temperature, passing a light radiation through said organic disulfide sensing color change in said radiation after its passage through said organic disulfide induced by variation in said temperature and employing said change to re-establish the said temperature.

4. A means for controlling a temperature comprising in combination a thermochromatic material, means for passing a radiation through said material, means for sensing color change of said radiation after its passage through said material, and means adapted to control said temperature responsive to said color changes.

5. A means according to claim 4 wherein the thermochromatic material is an organic disulfide.

6. A means according to claim 5 wherein said organic disulfide is selected from the group consisting of ditolyl disulfide, diphenyl disulfide and their oil solutions.

7. A device for automatic control of temperature comprising in combination a light source, photoelectric cells, connected so that the output of the one opposes the output of the other, responsive to said light source, means for conducting light from said light source separately to each of said photoelectric cells, a non-thermal responsive light filter interposed between said light source and one of said photoelectric cells, and a thermochromatic light filter interposed between said light source and the other of said photoelectric cells, an output pickup and an amplifier connected to receive the net output of said photoelectric cells, a detector to detect energy from the amplifier and a controller operated by said energy adapted to regulate the said temperature, the regulation thus accomplished being a function of the change of temperature of the thermochromatic substance.

WILLIAM B. WHITNEY.

References Cited in the file of this patent
UNITED STATES PATENTS

| Number | Name | Date |
| --- | --- | --- |
| 1,834,905 | Sheldon | Dec. 1, 1931 |
| 2,166,824 | Runaldue | July 18, 1939 |
| 2,195,395 | Chapman | Apr. 2, 1940 |
| 2,395,489 | Major | Feb. 26, 1946 |